United States Patent
Kojima (10) Patent No.: US 6,333,740 B1
(45) Date of Patent: Dec. 25, 2001

(54) IMAGE PROCESSING APPARATUS

(75) Inventor: Kunio Kojima, Funabashi (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/219,116

(22) Filed: Dec. 23, 1998

(30) Foreign Application Priority Data

Jan. 6, 1998 (JP) ................................................ 10-000780

(51) Int. Cl.⁷ ................................................ G06T 15/00
(52) U.S. Cl. ........................................... 345/419; 345/420
(58) Field of Search .................................. 345/419, 420, 345/423, 473, 474

(56) References Cited

U.S. PATENT DOCUMENTS

| | | | |
|---|---|---|---|
| 5,414,801 | * 5/1995 | Smith et al. | 395/119 |
| 5,694,531 | * 12/1997 | Golin et al. | 395/119 |
| 5,945,976 | * 8/1999 | Iwamura et al. | 345/139 |
| 5,986,675 | * 11/1999 | Anderson et al. | 345/473 |

FOREIGN PATENT DOCUMENTS

| | | |
|---|---|---|
| 09-081577A | 3/1997 | (JP) . |
| 09-198407A | 7/1997 | (JP) . |
| 09-297835A | 11/1997 | (JP) . |

* cited by examiner

Primary Examiner—Mark Zimmerman
Assistant Examiner—Enrique L Santiago (57) ABSTRACT

An image processing apparatus which allows for information search from items arranged in virtual space, includes: an intra-visual field polygon discriminating means for determining the polygons constituting the surfaces of 3D shapes displayed in the visual field; a polygon data storing means for storing the polygons which were determined to be within the visual field by the intra-visual field polygon discriminating means; a pre-observed polygon identifying means for judging whether currently observed polygons are the same as those stored in the polygon data storing means; and a display processing means for changing the display state of polygons which have been determined to have been priorly seen.

16 Claims, 12 Drawing Sheets

IMAGE PROCESSING APPARATUS

BACKGROUND OF THE INVENTION

(1) Field of the Invention

The present invention relates to an image processing apparatus which allows for information search from items arranged in a virtual space. More specifically it relates to an image processing apparatus which promotes confirmation of information which has been once observed.

(2) Description of the Prior Art

Conventionally, development has been made for creating a visual display of a virtual space through three-dimensional computer graphics (3D CG). A technology with which desired pieces of information can be searched for as a user walks through the virtual space is offered by constructing a database using such a virtual space.

For example, Japanese Patent Application Laid-Open Hei 9 No.198,407, discloses a technology in which the image of a virtual space having a hierarchical structure is displayed on a virtual space display frame and the display of the virtual space is replaced, in accordance with the user's indication of movement, as if the user were flying in the air and observing with a bird's eye view, as if the user were on an elevator going up and down, or as if the user were walking around. This thereby allows the user to search for search targets such as books etc., laid out therein.

Japanese Patent Application Laid-Open Hei 9 No.81,577 discloses a configuration for supporting the user's information walk-through in which access history of the user to accumulated information scattered on the network is recorded in the computer so as to lay out 3D CG objects corresponding to the accumulated information based on the record. This thereby dynamically creates the space suitable for the user's information walk-through by reflecting the history of the user's past walk-through.

Japanese Patent Application Laid-Open Hei 9 No.297,835 discloses a virtual space type database searching method in which operator's actions in the virtual space type database are summarized into summary images of information in the form of a comic strip. When a particular cartoon frame of information is selected from the summary images of information, the visual field jumps to the virtual space corresponding to the selected frame of image so as to allow the operator to restart their action in the virtual space.

However, in the above prior art techniques, since the scenes and/or shapes which have been already viewed could not be checked during moving and searching in the virtual space, the user would have to perform searching by repeatedly viewing 3D images which have been already seen; thus degrading the efficiency of searching in the virtual space.

SUMMARY OF THE INVENTION

The present invention has been devised in view of the above aspects and it is therefore an object of the present invention to provide an image processing apparatus which allows the user to confirm the past history of actions by displaying the portions which have been displayed in the past within the visual field.

In order to achieve the above object, the present invention is configured as follows:

In accordance with the first aspect of the present invention, an image processing apparatus which allows for information search from items arranged in virtual space, includes:

an intra-visual field polygon discriminating means for determining the polygons constituting the surfaces of 3D shapes displayed in the visual field;

a polygon data storing means for storing the polygons which were determined to be within the visual field by the intra-visual field polygon discriminating means;

a pre-observed polygon identifying means for judging whether currently observed polygons are the same as those stored in the polygon data storing means; and a display processing means for changing the display state of polygons which have been determined to have been priorly seen by the pre-observed polygon identifying means.

In accordance with the second aspect of the present invention, the image processing apparatus having the above first feature, further includes a triangle sub-dividing means for dividing a polygon, when it straddles the interior and exterior of the visual field, by triangles, at the boundary of the visual field.

In accordance with the third aspect of the present invention, the image processing apparatus having the above first feature, further includes a visual field setting means for arbitrarily setting up a boundary based on which the intra-visual field polygon discriminating means determines the polygons that reside within the visual field.

In accordance with the fourth aspect of the present invention, the image processing apparatus having the above first feature, further includes a display timing setting means for arbitrarily setting the timing at which the display processing means changes the displayed state of polygons.

In accordance with the fifth aspect of the present invention, the image processing apparatus having the above first feature, further includes a display range setting means for arbitrarily setting the range within which the display processing means changes the display state of polygons.

In accordance with the sixth aspect of the present invention, an image processing apparatus which allows for information search from items arranged in virtual space, includes:

an intra-visual field polygon discriminating means for determining the polygons constituting the surfaces of 3D shapes displayed in the visual field;

a polygon data storing means for storing the polygons which were determined to be within the visual field by the intra-visual field polygon discriminating means;

a pre-observed polygon identifying means for judging whether currently observed polygons are the same as those stored in the polygon data storing means; and a texture processing means for mapping the predetermined texture onto the polygons which were identified as having been priorly observed by the pre-observed polygon identifying means.

In accordance with the seventh aspect of the present invention, the image processing apparatus having the above first feature, further includes a replay means for replaying the time variation of the history of actions from an arbitrary viewpoint.

In accordance with the eighth aspect of the present invention, the image processing apparatus having the above sixth feature, further includes a replay means for replaying the time variation of the history of actions from an arbitrary viewpoint.

Next, the operations of the invention will be described.

First, according to the first feature, if any polygon being currently observed is determined to be identical with one of the polygons which were stored by the polygon data storing means or displayed in the past within the visual field, the displayed state of the polygon is changed in a distinct manner. Accordingly, it is possible to readily check the history of the past actions, which enables efficient search of the virtual space.

Next, according to the second feature, since a polygon which straddles the interior and exterior of the visual field is divided into appropriate triangles, it is possible to change the displayed state properly by only the portion which has entered the visual field.

According to the third feature, since it is possible to arbitrarily set up a boundary of the visual field between the interior and the exterior thereof, the range within which the displayed state of objects is changed, can be adjusted, as required. For example, if a polygon has entered the visual field but is located far from the viewpoint, the displayed state of it may be unchanged.

According to the fourth feature, since it is possible to arbitrarily set the timing at which the displayed state of polygons is changed, the displayed state can be changed at various timings, as required. For example, the displayed state may be changed as soon as an object enters the visual field, or after some delay.

According to the fifth feature, since it is possible to arbitrarily set the range within which the displayed state of polygons is changed, the range of changing the displayed state can be appropriately selected as required. For example, the displayed state may be changed for each polygon as a unit; the display state may be changed for the whole 3D shape containing a corresponding polygon; or the display state may be changed for all the items throughout the same hierarchical layer which is the 3D shape containing a corresponding polygon.

According to the sixth feature, when the currently observed polygon is determined to be one of the polygons stored in the polygon data storing means, i.e., one which was displayed in the past within the visual field, this polygon is mapped with the predetermined texture so as to be distinct. Accordingly, it is possible to readily check the history of the past actions and hence achieve efficient search in the virtual space.

According to the seventh and eighth features, since the history of the past actions can be replayed continuously by animation, it is possible to check how, in a certain time-period, at what timing and in what order, polygons entered the visual field, from an arbitrary viewpoint.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Figure 1:
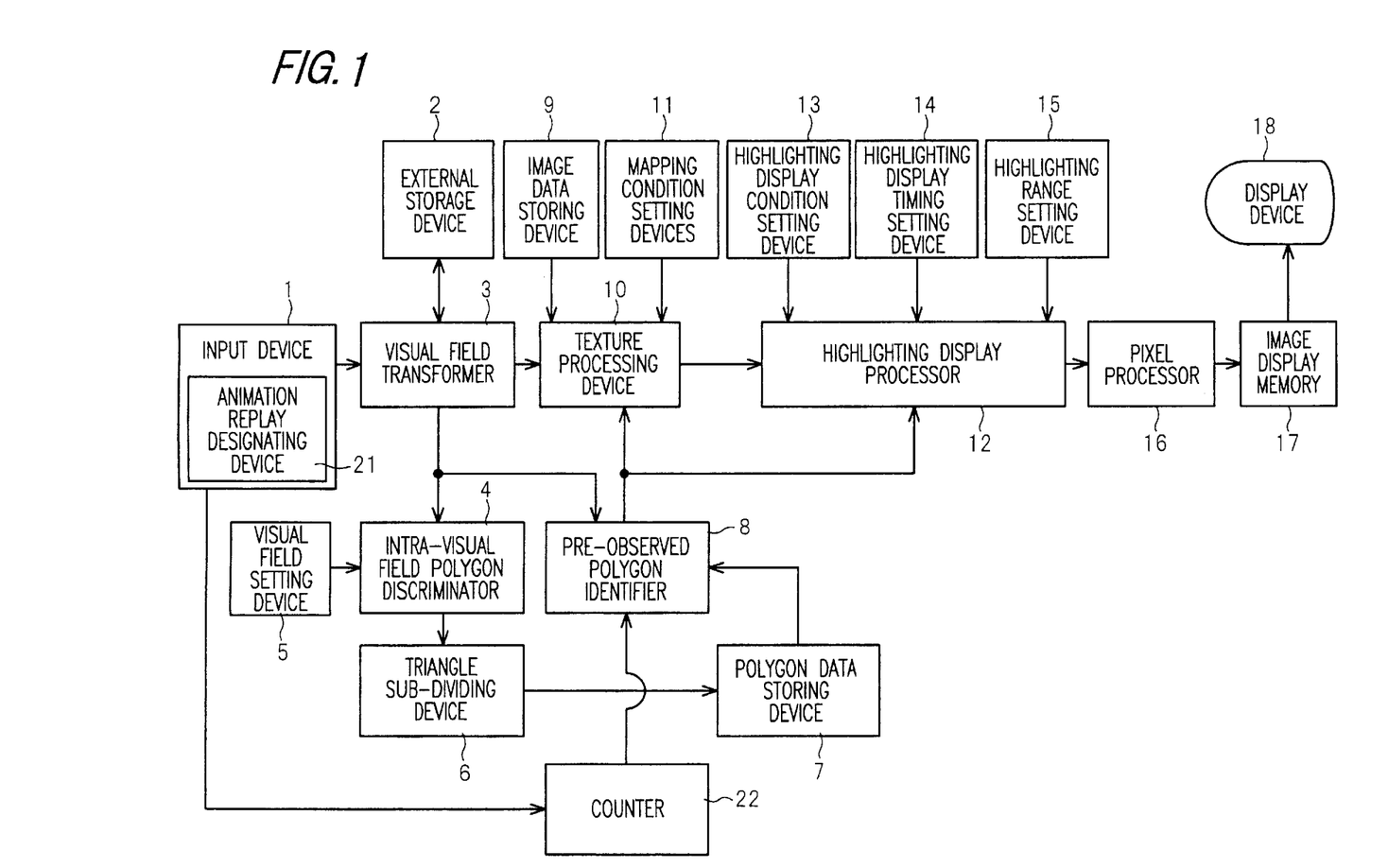
FIG. 1 is a functional block diagram showing the overall configuration of one embodiment of an image processing apparatus of the present invention.
Figure 2:
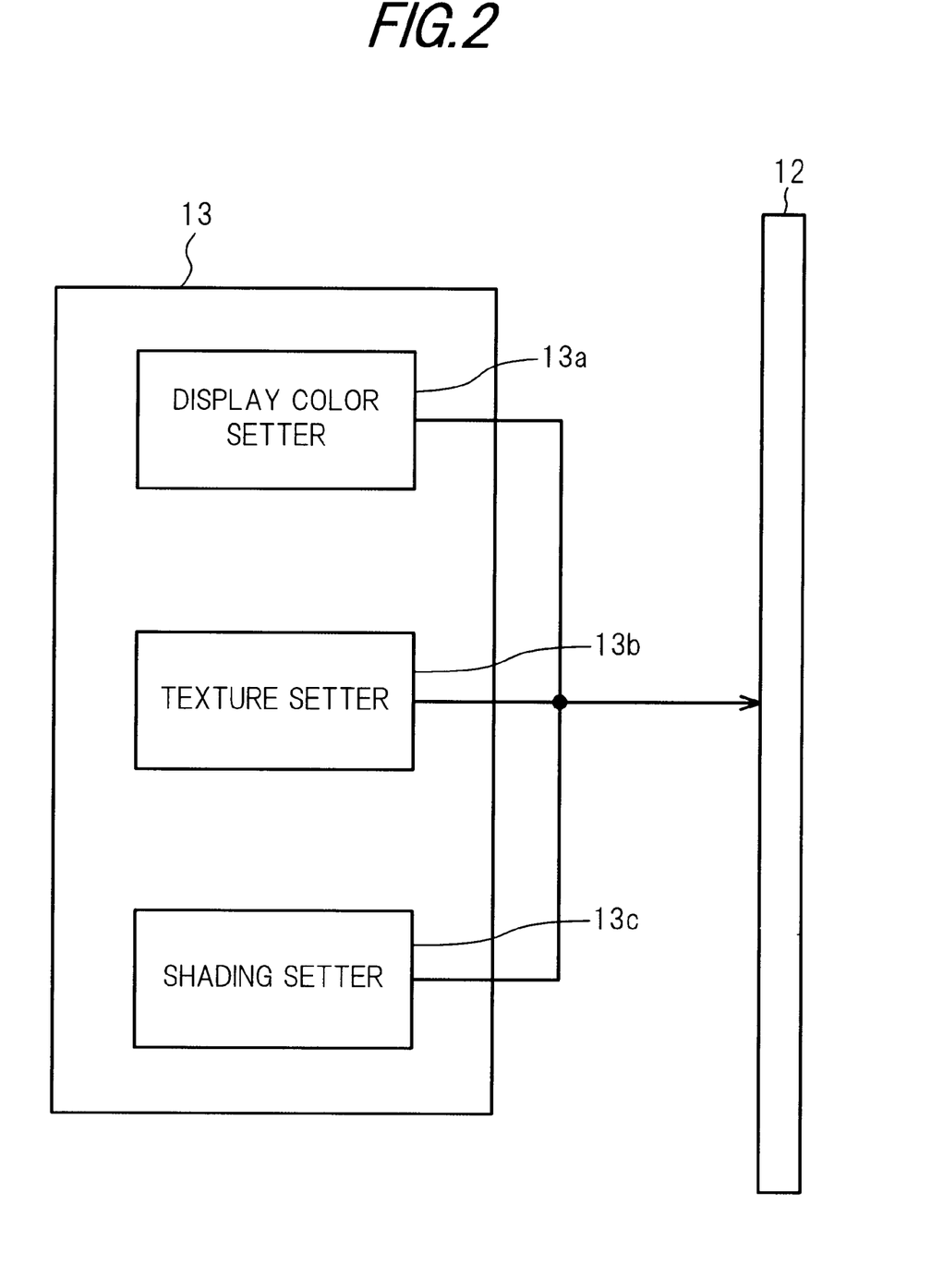
FIG. 2 is a functional block diagram showing a highlighting display setting means in one embodiment of an image processing apparatus of the present invention.
Figure 3:
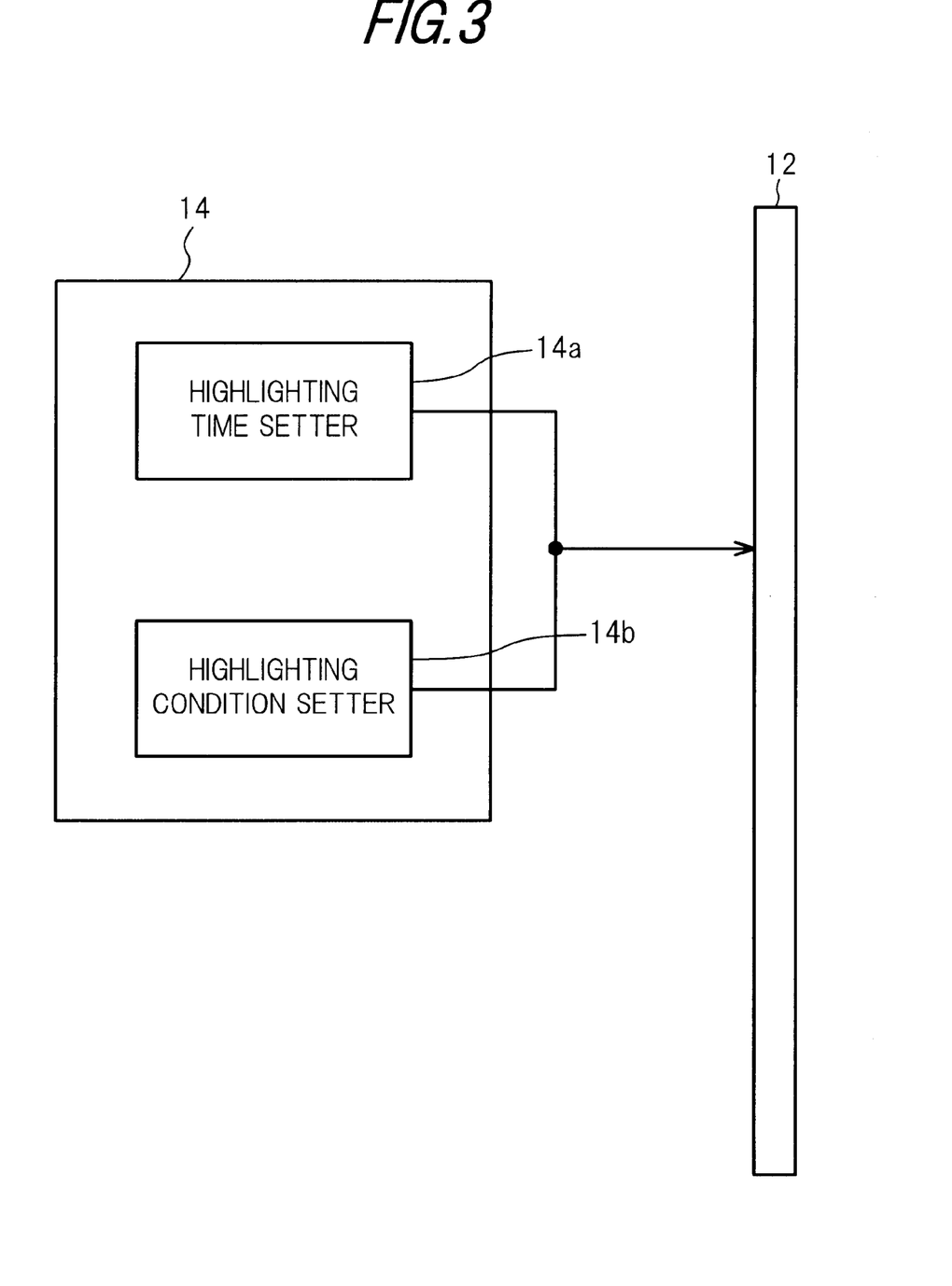
FIG. 3 a functional block diagram showing a highlighting display timing setting means in one embodiment of an image processing apparatus of the present invention.
Figure 4:
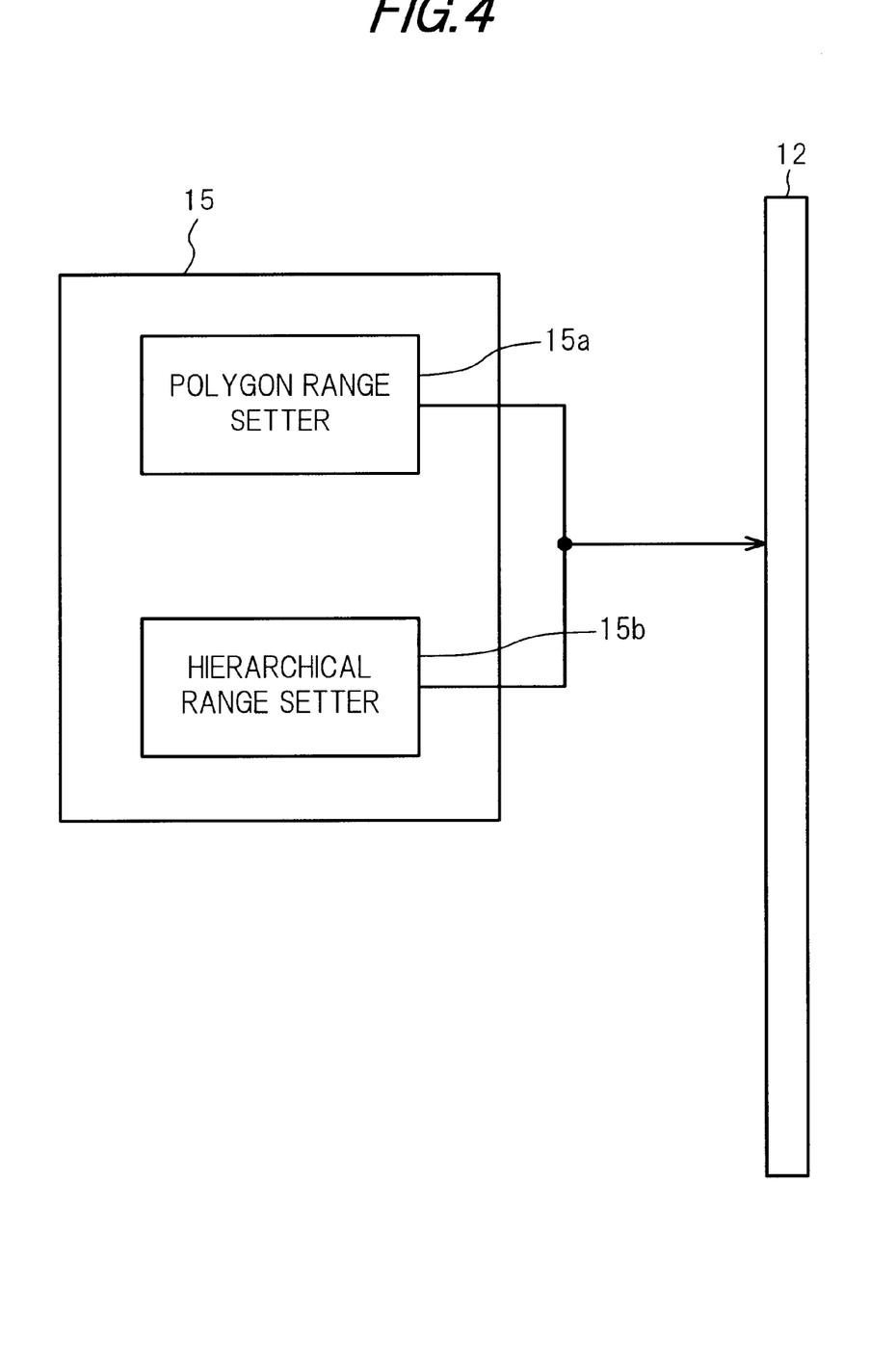
FIG. 4 is a functional block diagram showing a highlighting display area setting means in one embodiment of an image processing apparatus of the present invention.
Figure 5:
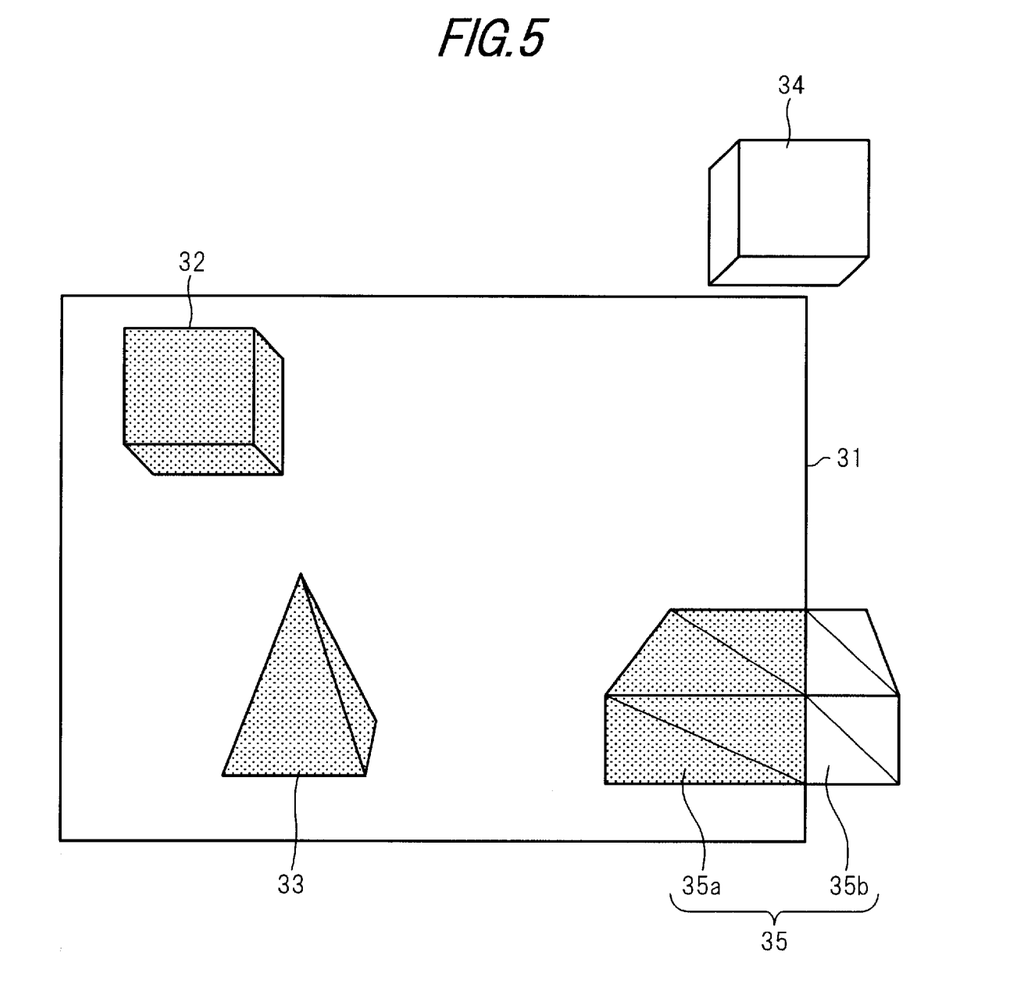
FIG. 5 is an illustrative view showing the operation of one embodiment of an image processing apparatus of the present invention.

The embodiment of an image processing apparatus of the present invention will hereinafter be described in detail with reference to FIGS. 1 through 5. Here, FIG. 1 is a functional block diagram showing the overall configuration of an image processing apparatus of this embodiment. FIG. 2 is a functional block diagram showing a highlighting display setting means in the image processing apparatus of this embodiment. FIG. 3 a functional block diagram showing a highlighting display timing setting means in the image processing apparatus of this embodiment. FIG. 4 is a functional block diagram showing a highlighting display area setting means in the image processing apparatus of this embodiment. FIG. 5 is a flowchart showing the overall operation of the image processing apparatus of this embodiment.

In FIG. 1, this image processing apparatus includes: an input device 1, such as a mouse, keyboard etc., for inputting the position of the visual point, the direction of the visual field, the angle of the visual field and the like; an external storage device 2 for storing shape data (polygon data) of objects to be rendered; and a visual field transformer 3 which produces a visual field coordinate system based on the input information from input means 1 and transforms the polygon data read out from external storage device 2 into the visual field coordinate data based on the visual field coordinate system.

An intra-visual field polygon discriminator 4 is for determining the polygons displayed in the visual field; a visual setting device 5 arbitrarily sets up a visual field boundary between the intra-visual field and extra-visual field, from data such as the distance and angle with respect to the visual point, the brightness difference and the like, so as to offer criterions based on which intra-visual field polygon discriminating means 4 performs its discriminating processes; and a triangle sub-dividing device 6 is for dividing a polygon which extends across the boundary of the visual field, into triangles at the boundary of the visual field.

A polygon data storage device 7, for storing the data about the polygons determined as being displayed within the visual field in relation to the points of time when they were determined; a pre-observed polygon identifier 8 compares a polygon which was transformed on the visual field coordinate system by visual field transformer 3, with the polygons stored in polygon data storing device 7 so as to judge whether the currently observed polygon is one which was displayed within the visual field in the past.

An image data storing device 9 stores two-dimensional images to be applied to polygons; a texture processing device 10 is for mapping two-dimensional images read out from image data storing device 9 onto corresponding polygons; and 11 a mapping condition setting device 11 selects data of an image to be mapped to the polygon which was determined by pre-observed polygon identifier 8 as being one which was displayed within the visual field in the past and which arbitrarily selects the mapping conditions, such as the direction of mapping the image of data, the number of repetitions, the transparency of the mapping and the like.

A highlighting display processor 12 is for highlighting the polygons determined by pre-observed polygon identifier 8 as having been already seen in the past; 13 a highlighting display condition setting device 13 is for arbitrarily setting up the color, transparency, light reflectance, shading method etc., of polygons to be highlighted; a highlighting display timing setting device 14 for arbitrarily setting the timing and conditions of highlighting; and a highlighting range setting device 15 is for arbitrarily setting the target range of polygons to be highlighted.

A pixel processor 16 performs depth comparison when two objects are superimposed with each other when viewed from the direction in which the z-axis lies, that is, it compares the z-axis coordinate values between the two objects so as to select the front-side pixels and performs a blending process for representing the transparency of an object and other processes; an image display memory 17 is for temporarily storing the video signal from pixel processor 16; and 18 a display device 18 is for displaying the video signal temporarily stored in the image display memory 17.

Further, an animation replay designating device 21 is for designating the point of view from which the animation of the history of the past actions to be replayed is viewed, the starting point of the replay, the ending point of the replay, and the replay speed; and a couter 22 measures the time from the starting point of the replay to the ending point, both designated by animation replay designating device 21, with reference to the replay speed and outputs the measurement to the pre-observed polygon identifier 8.

In the above configuration, highlighting display condition setting device 13 preferably include: as shown in FIG. 2, a display color setter 13*a* for adjusting RGB values and/or selecting a color from the color chart in order to set the color display of polygons to be highlighted; a texture setter 13*b* for setting the transparency, the light reflectance, etc., of polygons to be highlighted; and a shading setter 13*c* for choosing to a way to shade the polygons to be highlighted, from flat shading, smooth shading, phong shading etc.

Highlighting display timing setting device 14 preferably include as shown in FIG. 3, a highlighting time setter 14*a* for setting the time of display of polygons to be highlighted; and a highlighting condition setter 14*b* for setting up the conditions under which the timing of highlighting is controlled. As to the conditions, highlighting may be effected when a polygon which once appeared in the visual field went out of sight and then reappeared within the visual field; or highlighting may be effected after the passage of a certain preset time.

Highlighting display range setting device 15 preferably include as shown in FIG. 4, a polygon range setter 15*a* for setting how far a single shape containing polygons to be highlighted is highlighted; and a hierarchical range setter 15*b* for setting how far the range of polygons is highlighted if they have a hierarchical structure.

Next, the operation of the image processing apparatus of this embodiment will be described with reference to FIGS. 5 through 12. First, intra-visual field polygon discriminator 4 judges whether polygons which are represented in the visual field coordinate system by transformation of visual field transformer 3 are residing within the display field of view. For example, in FIG. 5, it is determined that 3D shapes 32 and 33 exist in visual field range 31 displayed on the image frame while 3D shape 34 is out of the display field.

Further, it is also determined that 3D shape 35 straddles the interior and exterior of the visual field. This shape 35 is appropriately divided, with respect to visual field range 31, by triangles into two 3D shapes 35*a* and 35*b* by triangle sub-dividing device 6. The 3D shapes 32, 33 and 35*a* which were determined to be within the field of view are stored with their time of judgment into polygon data storing device 7.

Figure 6A:
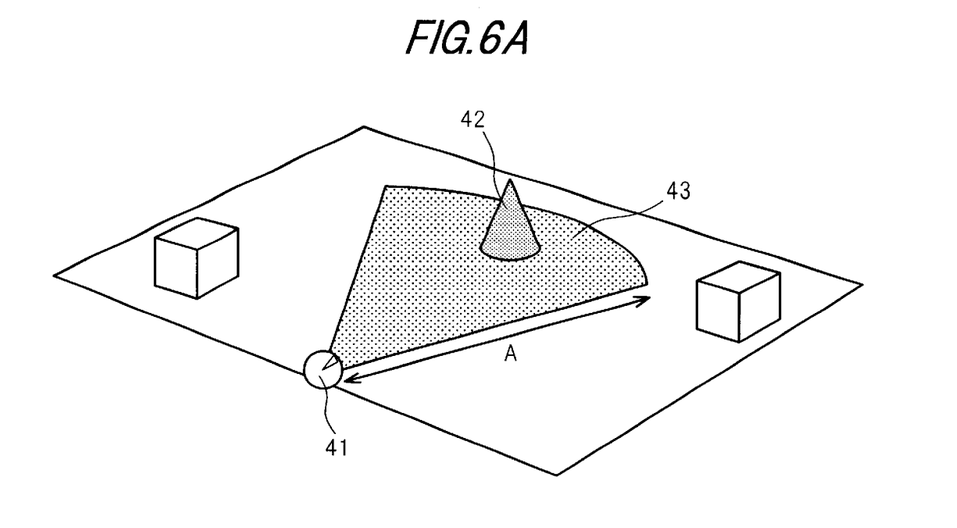
FIGS. 6A and 6B are illustrative views showing the operation of one embodiment of an image processing apparatus of the present invention.
Figure 6B:
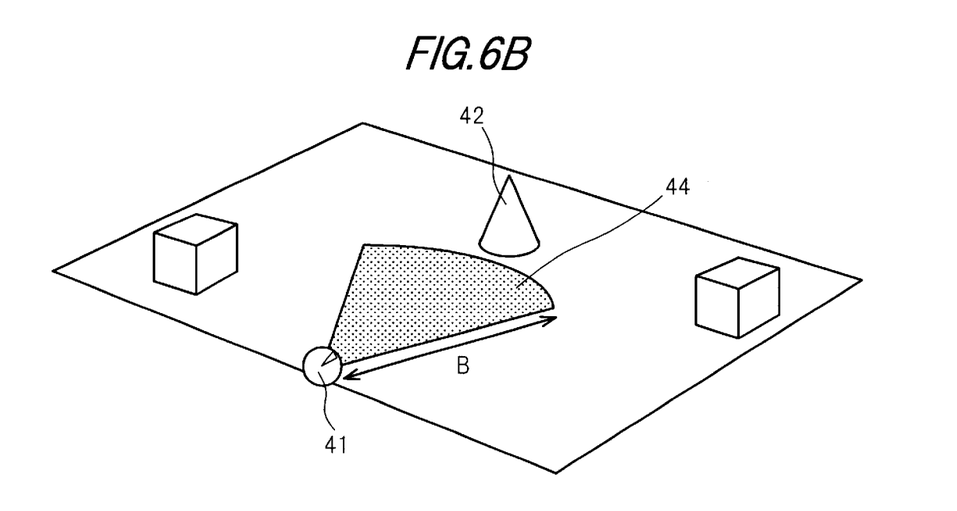

Here, the field boundary as the judgement basis in intra-visual field polygon discriminator 4 can be set arbitrarily by visual range setting means 5. For example, in FIG. 6A, a range 43 from a viewpoint 41 of the observer to the depth of a distance A is set up as the field of view. So 3D shape 42 is determined to be within the observer's view. On the other hand, in FIG. 6B, since a range 44 from a viewpoint 41 of the observer to the depth of a distance B is set up as the field of view, 3D shape 42 is determined to be out of the observer's view.

In pre-observed polygon identifier 8, it is checked whether the polygons which were represented in the visual field coordinate system after the transformation of visual field transformer 3 match the polygons stored in polygon data storing device 7. If any polygon has been determined to be identical with one of the polygons stored in polygon data storing device 7, the currently viewed polygon is regarded to be one that was viewed in the past, and the pre-observed polygon identifier 8 outputs the control signal to texture processing means 10 and highlighting display processor 12.

Figure 7A:
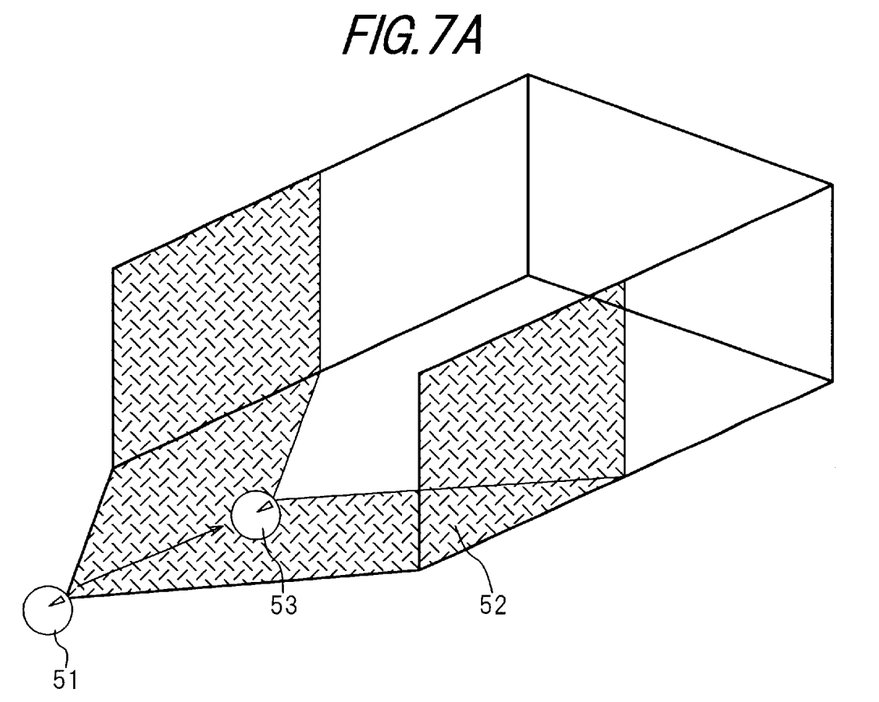
FIGS. 7A and 7B are illustrative views showing the operation of one embodiment of an image processing apparatus of the present invention.

Upon receiving the control signal from pre-observed polygon identifier device 8, texture processing means 10 regards the polygon as having been viewed in the past and hence maps the predetermined texture image which was prepared beforehand onto the polygon. For example, in FIG. 7A, an area 52 which was viewed in the past from a viewpoint 51, is applied with an image of punching metal as the texture mapping data so that the observer can easily confirm the history of the past actions. Accordingly, the observer can move their point of view to a viewpoint 53, from where the information search will be restarted. Thus, it is possible to perform an efficient search in the virtual space.

Figure 7B:
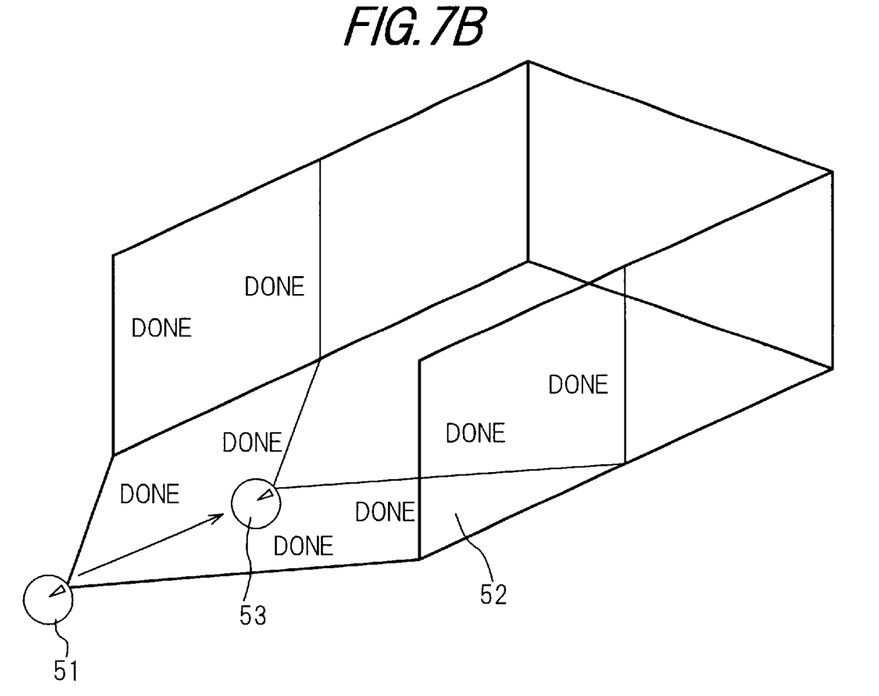

FIG. 7B illustrates a configuration in which a word 'DONE' that indicates that the observation has been done is used as the texture mapping data. The observer can confirm the area which has been viewed in the past by means of the letters 'DONE', therefore the observer can move their point of view to viewpoint 53 to restart searching for information which has not been viewed yet.

Figure 8A:
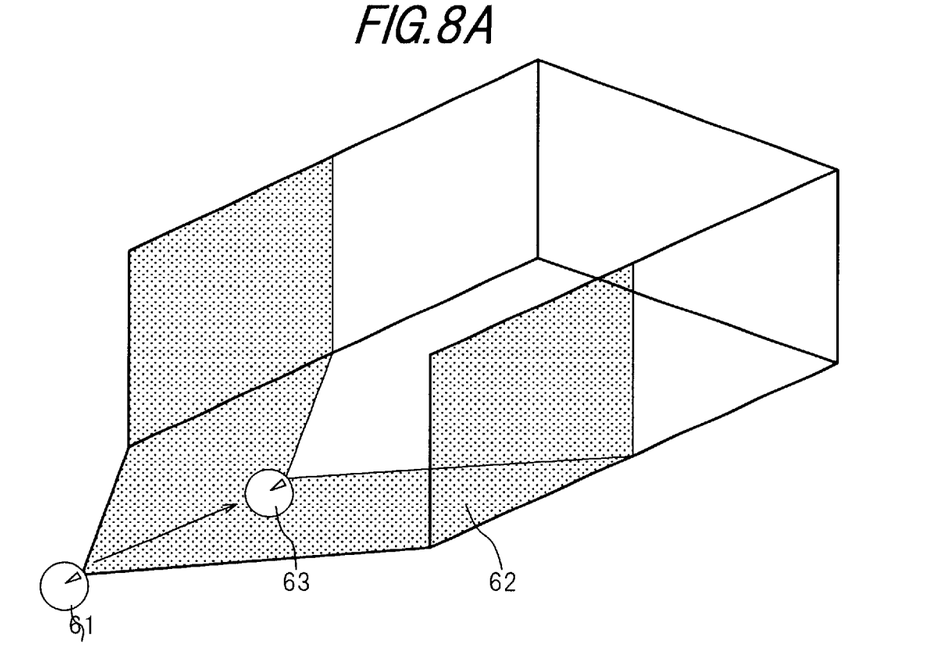
FIGS. 8A and 8B are illustrative views showing the operation of one embodiment of an image processing apparatus of the present invention.

Upon receiving the control signal from pre-observed polygon identifying device 8, highlighting display processing device 12 regards the polygon as having been viewed in the past and hence produces highlighted display in accordance with the conditions set up by highlighting display condition setting device 13. For example, in FIG. 8A, an area 62 which was viewed in the past from a viewpoint 61, is displayed darker so as to allow the observer to readily confirm the history of the past actions. Accordingly, the observer moves their point of view to a viewpoint 63, from where the information search will be restarted. Thus, it is possible to perform an efficient search in the virtual space.

Figure 8B:
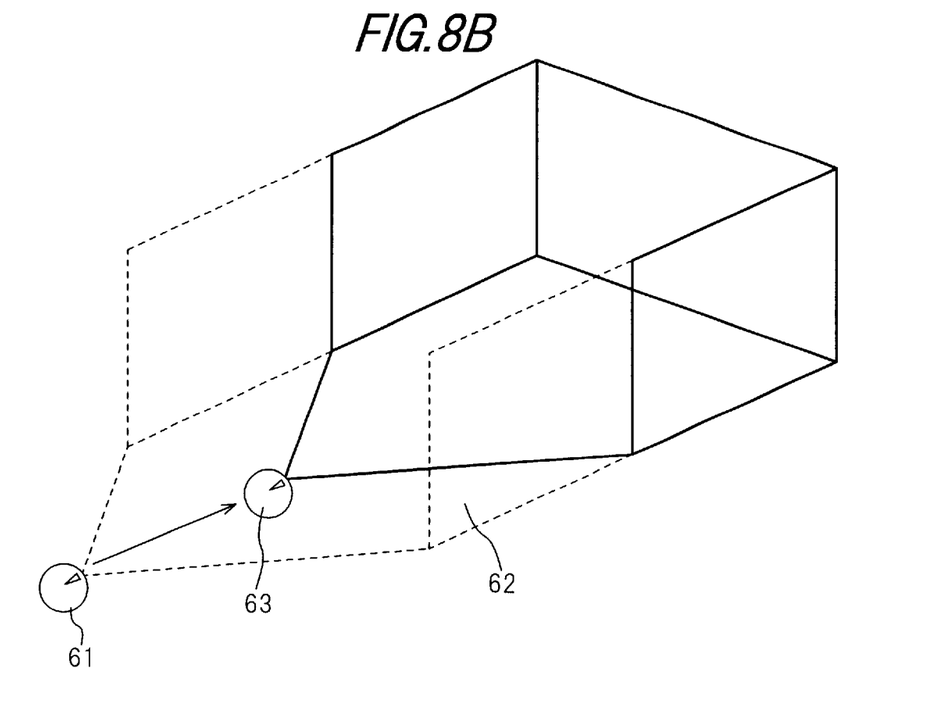

FIG. 8B shows a configuration in which area 62 which was viewed in the past from viewpoint 61 is displayed in a transparent manner. Since the observer can confirm the area which has been viewed in the past by the transparent display, the observer can move their point of view to viewpoint 63 to restart searching for information which has not been viewed yet.

Figure 9A:
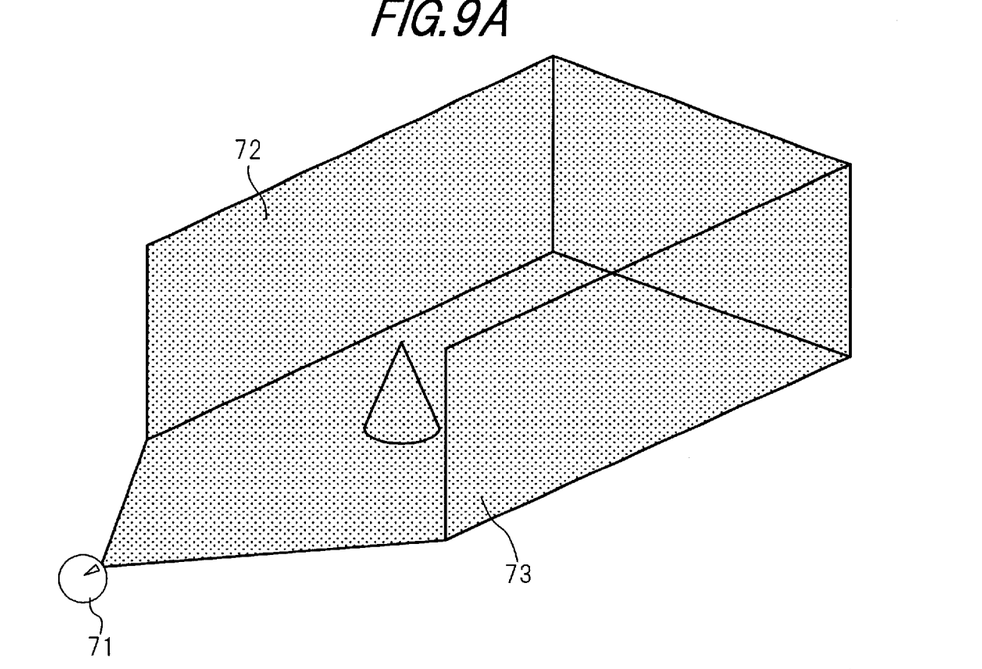
FIGS. 9A and 9B are illustrative views showing the operation of one embodiment of an image processing apparatus of the present invention.

Here, the timing at which highlighting display processor means 12 highlights the polygons can be arbitrarily set by means of highlighting display timing setting device 14. For example, in FIG. 9A, the polygons are adapted to be highlighted as soon as they become displayed in the visual field. So all the area 73 including a 3D shape 72 displayed within the visual field from observer's viewpoint 71 are highlighted with a dark shading.

Figure 9B:
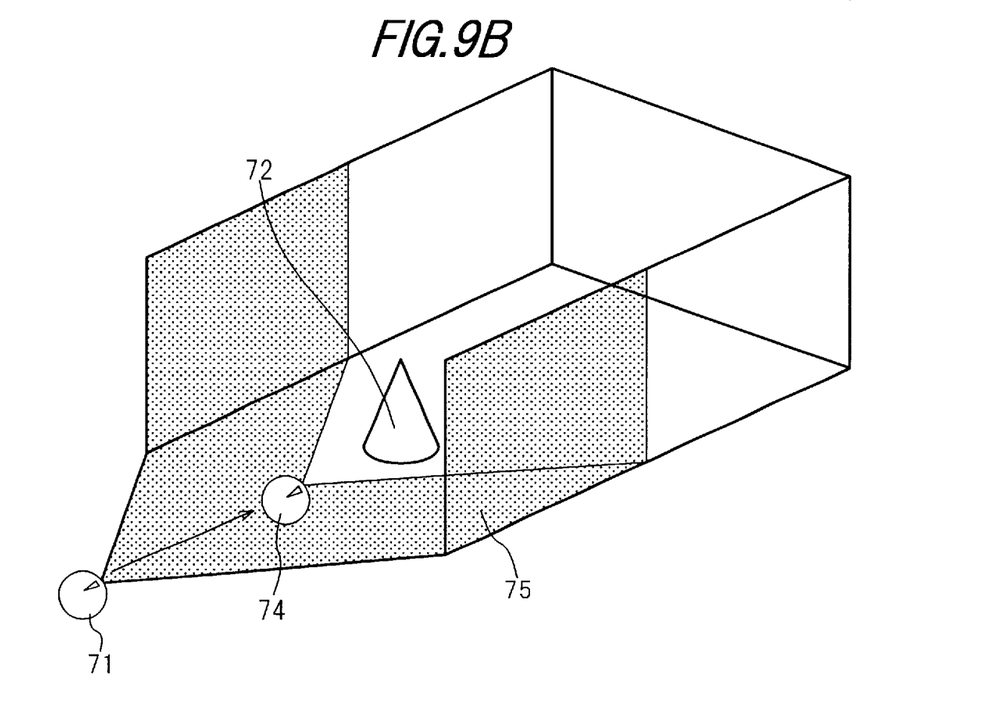

In contrast, in FIG. 9B, the polygons are adapted to be highlighted when the polygons once having been displayed in the visual field go out from the visual field. Therefore, of the area displayed within the visual field from observer's viewpoint 71, area 75 which goes out of the visual field from a viewpoint 74 after movement occurs is highlighted with dark shading while 3D shape 72 which remains within the visual field will not be highlighted.

Figure 10A:
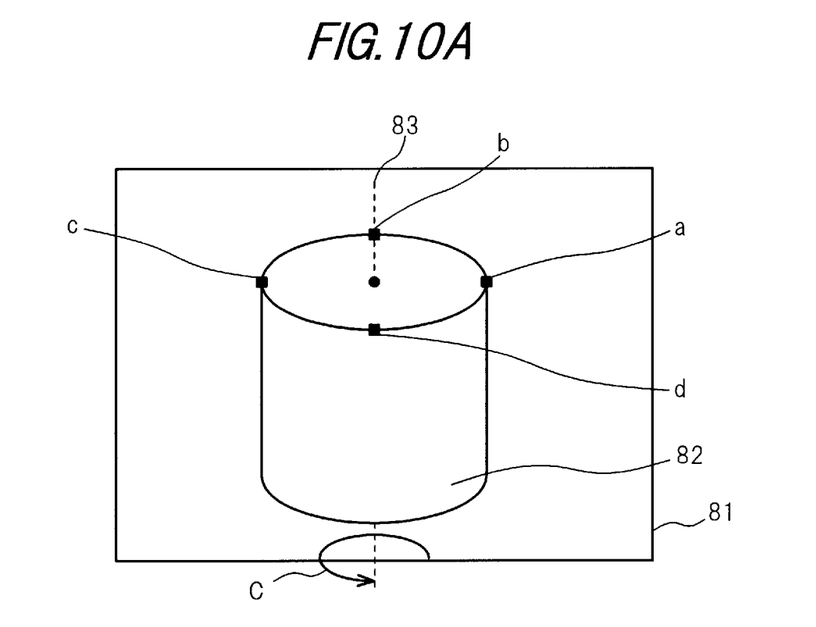
FIGS. 10A, 10B and 10C are illustrative views showing the operation of one embodiment of an image processing apparatus of the present invention.

A further specific explanation will be given for the latter case in which highlighting is effected when polygons once having been displayed in the visual field go out from the visual field. Suppose, as shown in FIG. 10A, a cylindrical shape 82 displayed in an image frame 81 is rotating counterclockwise (in the direction of arrow C in FIG. 10A) about a central axis 83. When this cylindrical shape 82 has rotated 90 degrees, the portion (designated at 84 in FIG. 10B in which the cylinder is viewed from the rear side with respect to the front face of image frame 81) between points 'a' and 'd' will be highlighted because this portion has gone out of the visual field. It should be noted that no part will be highlighted in image frame 81.

Figure 10B:
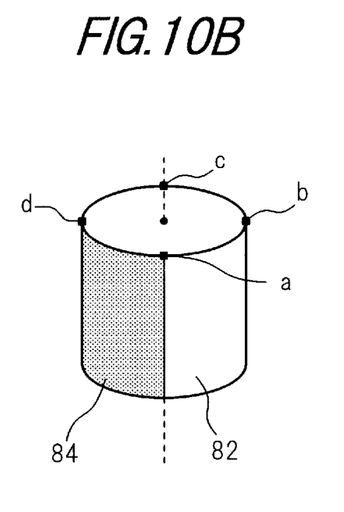
Figure 10C:
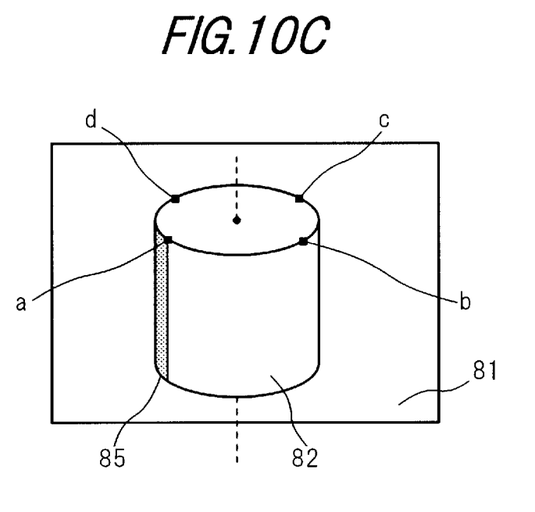

When cylindrical shape 82 has rotated more than 180 degrees, the area downstream of point 'a' (with respect to the rotating direction) designated at 85 in image frame 81 will appear again in the visual field and hence will be highlighted. Thus, any polygons, which have been once displayed in the visual field and have gone out thereof and then appeared again in the visual field, are adapted to be highlighted, so that it becomes possible to readily know which part of a 3D object the observer started viewing from.

Figure 11A:
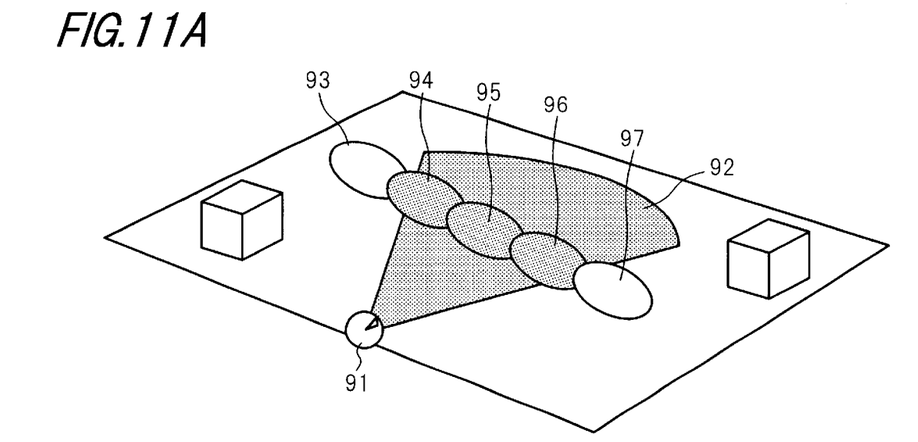
FIGS. 11A, 11B and 11C are illustrative views showing the operation of one embodiment of an image processing apparatus of the present invention.
Figure 11B:
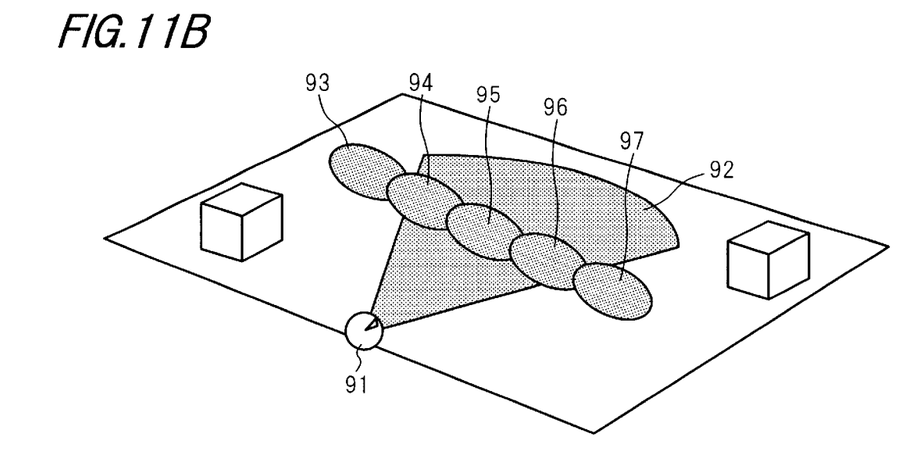
Figure 11C:
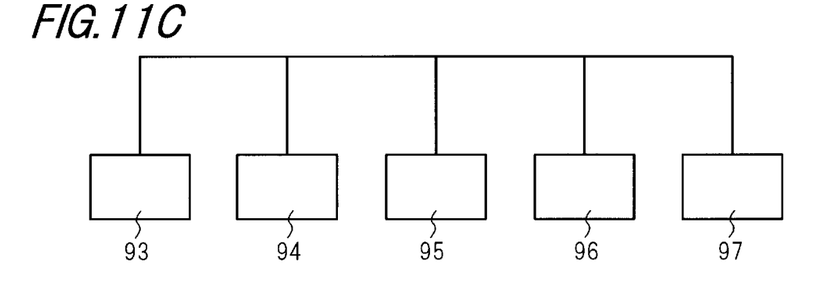

Further, the range in polygons to be highlighted by highlighting display processor mean 12 can be arbitrarily set up by highlighting display range setting device 15. For example, in the case shown in FIG. 11A, highlighting is adapted to be done for each shape as a unit, so that 3D shapes 94, 95 and 96, which all are displayed within a visual field 92 with respect to an observer's viewpoint 91, are highlighted with dark shading. In the case shown in FIG. 11B, the whole hierarchical layer containing shapes displayed within the visual field is adapted to be highlighted, so that all shapes 93 to 97 having the hierarchical structure shown in FIG. 11C will be highlighted with dark shading with respect to an observer's viewpoint 91.

Next, the operation of animation replay in this embodiment will be described with reference to FIG. 12. First, animation replay designating device 21 outputs the position of a viewpoint from which the animation replay is to be observed, to visual field transformer 3, while outputting the starting time and ending time of the animation replay and the replay speed of the animation, to counter 22.

Visual field transformer 3 transforms the polygon data read out from external storage mean 2, into one represented in the visual field coordinate system, based on the position of the viewpoint indicated by visual field transformer 3. This is followed by similar processing to that described heretofore. Counter 22 counts at the designated speed from the designated replay starting time to the designated replay ending time, and outputs it to pre-observed polygon identifier 8.

Pre-observed polygon identifier 8 performs comparison and judgement as to whether the polygons represented in the visual field coordinate system after the transformation by visual field transformer 3, will match any of the polygons stored in polygon data storing device 7, and also compares the time at which the matching polygon was stored into polygon data storing device 7 and the time received from counter 22. The time measured by counter 22 is that after the time at which the matching polygon was stored into polygon data storing device 7, the pre-observed polygon identifier 8 outputs a control signal to texture processor mean 10 and highlighting display processing means 12.

Figure 12:
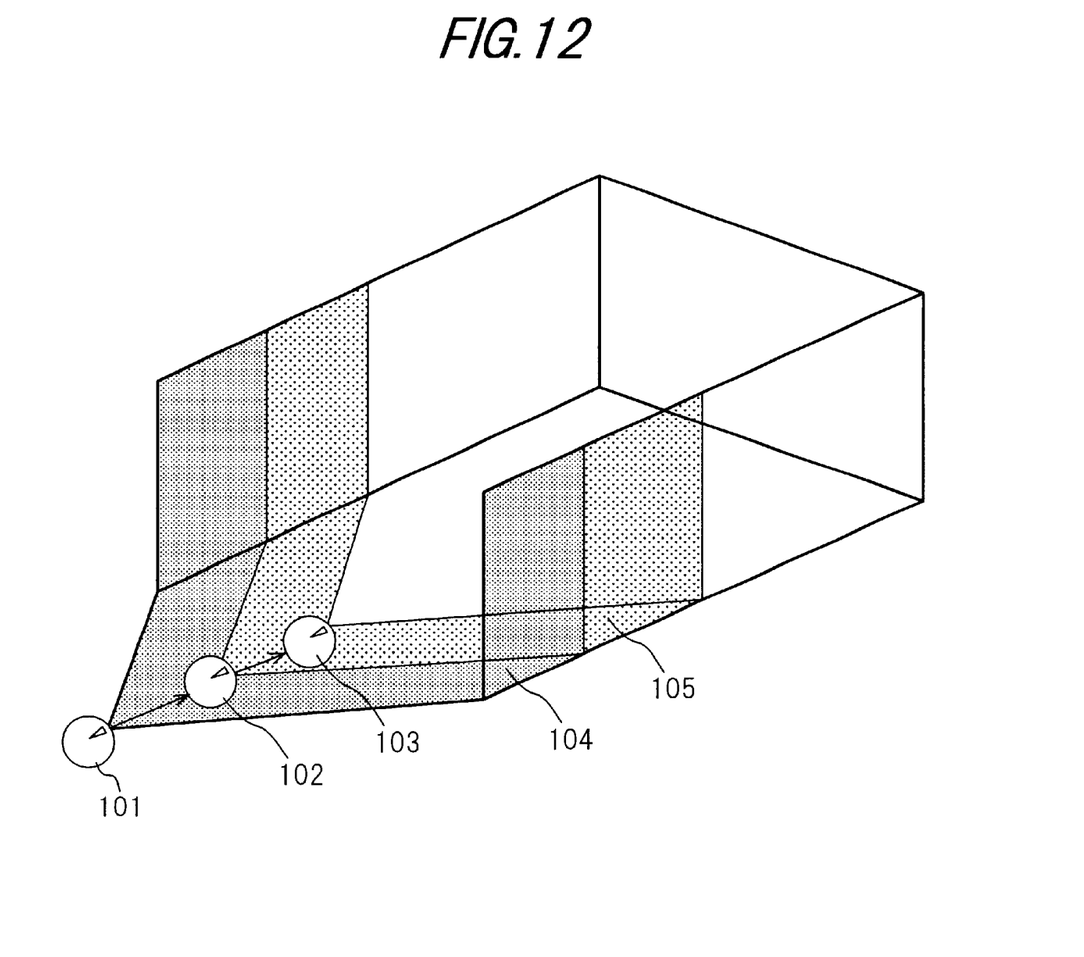
FIG. 12 is an illustrative view showing the operation of the replay of an animation in one embodiment of an image processing apparatus of the present invention.

Illustratively, in FIG. 12, suppose the observer's point of view has moved from a first viewpoint 101 (at time 'a' in the past) passing a second viewpoint 102 (at time 'b') to a third viewpoint 103 (at time 'c'). When the animation of this situation is replayed at 2× speed mode, for example, counter 22 starts counting at two times the speed, from the designated replay starting time. When the counter 22 value counter reaches 'b', the portion designated at 104 which has gone out of the visual field is mapped with the predetermined texture image and displayed with highlighting. Further when the counter 22 count value reaches 'c', the portion designated at 105 which has gone out of the visual field is mapped with the predetermined texture image and displayed with highlighting.

In this way, the history of the observer's past actions can be replayed continuously and at a high speed with the passage of time. Accordingly, it is possible to know what route the observer took in the virtual space during the past walk-through whilst checking the view from the observer's viewpoint, i.e., from successive different points in the route along which the observer actually made the search.

As has been apparent from the configurations of the above embodiment, the present invention has excellent effects as follows:

First, since the image processing apparatus according to the first aspect of the invention has the configuration as above, if any polygon being currently observed is determined to be identical with one of the polygons which were displayed in the past within the visual field, the displayed state of the polygon is changed in a distinct manner. Accordingly, it is possible to readily check the history of the past actions, which enables efficient search of the virtual space.

Next, since in the image processing apparatus according to the second aspect of the invention, a polygon which straddles the interior and exterior of the visual field is divided into appropriate triangles, it is possible to change the displayed state properly by only the portion which has entered the visual field.

Since in the image processing apparatus according to the third aspect of the invention, it is possible to arbitrarily set up a boundary of the visual field between the interior and the exterior thereof, the range within which the displayed state of objects is changed, can be adjusted, as required: for example, if a polygon has entered the visual field but is located far from the viewpoint, the displayed state of it may be unchanged.

Next, since in the image processing apparatus according to the fourth aspect of the invention, it is possible to arbitrarily set the timing at which the displayed state of polygons is changed, the displayed state can be changed at various timings, as required: for example, the displayed state may be changed as soon as an object enters the visual field, or after some delay.

Since in the image processing apparatus according to the fifth aspect of the invention, it is possible to arbitrarily set the range within which the displayed state of polygons is changed, the range of changing the displayed state of the polygons can be appropriately selected as required. For example, the displayed state may be changed for each polygon as a unit; the display state may be changed for the whole 3D shape containing a corresponding polygon; or the display state may be changed for all the items throughout the same hierarchical layer which is the 3D shape containing a corresponding polygon.

In the image processing apparatus according to the sixth aspect of the invention, when the currently observed polygon is determined to be one of the polygons stored in the polygon data storing means, i.e., one which was displayed in the past within the visual field, this polygon is mapped with the predetermined texture so as to be distinct. Accordingly, it is possible to readily check the history of the past actions and hence achieve efficient search in the virtual space.

Since in the image processing apparatus according to the seventh and eighth aspects of the invention, the history of the past actions can be replayed continuously by animation, it is possible to check how, in a certain time-period, at what timing and in what order, polygons entered the visual field, from an arbitrary viewpoint.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image processing apparatus which allows for information search from items arranged in virtual space, comprising:
   intra-visual field polygon discriminating means for determining polygons constituting surfaces of 3D shapes displayed in a visual field;
   polygon data storing means for storing the polygons determined to be within the visual field by the intra-visual field polygon discriminating means;
   pre-observed polygon identifying means for judging whether newly observed polygons include polygons stored in the polygon data storing means; and
   display processing means for changing a display state of polygons judged to have been previously observed by the pre-observed polygon identifying means.

2. The image processing apparatus according to claim 1, further comprising triangle sub-dividing means for dividing a polygon into triangles, when it straddles an interior and an exterior boundary of the visual field, at the boundary of the visual field.

3. The image processing apparatus according to claim 1, further comprising visual field setting means for setting up a boundary based on the intra-visual field polygon discriminating means determining polygons that reside within the visual field.

4. The image processing apparatus according to claim 1, further comprising display timing setting means for setting timing at which the display processing means changes the displayed state of polygons.

5. The image processing apparatus according to claim 1, further comprising display range setting means for setting a range within which the display processing means changes the display state of polygons.

6. An image processing apparatus which allows for information search from items arranged in virtual space, comprising:
   intra-visual field polygon discriminating means for determining polygons constituting surfaces of 3D shapes displayed in a visual field;
   polygon data storing means for storing the polygons determined to be within the visual field by the intra-visual field polygon discriminating means;
   pre-observed polygon identifying means for judging whether newly observed polygons include polygons stored in the polygon data storing means; and
   texture processing means for mapping a predetermined texture onto the polygons judged as having been previously observed by the pre-observed polygon identifying means.

7. The image processing apparatus according to claim 1, further comprising replay means for replaying a time variation of a history of actions from an arbitrary viewpoint.

8. The image processing apparatus according to claim 6, further comprising a replay means for replaying a time variation of a history of actions from an arbitrary viewpoint.

9. An image processing apparatus comprising:
   an intra-visual field polygon discriminator, adapted to determine polygons constituting surfaces of 3D shapes displayed in a visual field;
   polygons data storage, adapted to store polygons determined to be within the visual field by the intra-visual field polygon discriminator;
   pre-observed polygon identifier, adapted to judge whether newly observed polygons include polygons stored in the polygon data storage; and
   display processor, adapted to change a display state of polygons judged to have been observed by the pre-observed polygon identifier.

10. The image processing apparatus according to claim 9, further comprising a triangle sub-divider adapted to divide a polygon into triangles, when straddling an interior and an exterior boundary of the visual field, at the boundary of the visual field.

11. The image processing apparatus according to claim 9, further comprising a visual field setter, adapted to set up a boundary based on the intra-visual field polygon discriminator determining polygons that reside within the visual field.

12. The image processing apparatus according to claim 9, further comprising a display timing setter, adapted to set timing at which the display processor changes the displayed state of polygons.

13. The image processing apparatus according to claim 9, further comprising a display range setter, adapted to set a range within which the display processor changes the displayed state of polygons.

14. The image processing apparatus according to claim 9, further comprising a replay device, adapted to replay a time variation of a history of actions from an arbitrary viewpoint.

15. The image processing apparatus which allows for information search from items arranged in virtual space, comprising:

intra-visual field polygon discriminator, adapted to determine polygons constituting surfaces of 3D shapes displayed in a visual field;

polygon data storage, adapted to store the polygons determined to be within the visual field by the intra-visual field polygon discriminator;

pre-observed polygon identifier, adapted to judge whether newly observed polygons include polygons stored in the polygon data storage; and texture processor, adapted to map a predetermined texture onto the polygon judged as having been previously observed by the pre-observed polygon identifier.

16. The image processing apparatus according to claim 15, further comprising a replay device, adapted to replay a time variation of a history of actions from an arbitrary viewpoint.

* * * * *